Figure 3:
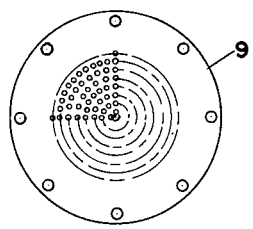

July 11, 1950 W. B. BURFORD, III., ET AL 2,515,112
METHOD FOR DISPOSING OF CORROSIVE GASES
Original Filed Dec. 12, 1946

Inventor
W. B. BURFORD III
H. C. ANDERSON

By Robert A. [signature]

Attorney

Patented July 11, 1950

2,515,112

UNITED STATES PATENT OFFICE 2,515,112

METHOD FOR DISPOSING OF CORROSIVE GASES

William B. Burford, III, and Harry C. Anderson, Baltimore, Md., assignors to the United States of America as represented by the United States Atomic Energy Commission Original application December 12, 1946, Serial No. 715,878. Divided and this application June 3, 1948, Serial No. 30,964

1 Claim. (Cl. 23—2)

The present invention relates to a method and apparatus for the disposal of highly corrosive fluorine-containing gases. This is a divisional application of our copending application Ser. No. 715,878 filed December 12, 1946, now abandoned.

The disposal of waste fluorine, on a relatively large scale, has existed as a difficult problem for a great many years. Because of the highly corrosive nature of fluorine and the inadequate facilities for handling this gas, the art of fluorine chemistry has been retarded in its development. The desirability of solving these problems will be apparent to anyone skilled in the art of fluorine chemistry, for it is obvious that because of the extreme reactivity of this element, an almost limitless number and variety of new compounds and new materials will thus be made available for the enjoyment of mankind. This will be readily apparent when it is considered that fluorine can be substituted for hydrogen in most organic compounds. Hence it is possible to have as many fluorocarbons as there are hydrocarbons.

It is an object of the present invention to provide an efficient method for the disposal of waste fluorine. It is a further object of this invention to provide a method for disposing of corrosive gases generally and of corrosive fluorine-containing gases, particularly by reducing to a minimum the corrosive action of said gases on the apparatus employed.

It is a still further object of this invention to provide an efficient apparatus for the disposal of corrosive gases, particularly fluorine-containing gases.

In accordance with the present invention, the above and other objects, which will appear hereinafter, are accomplished by reacting corrosive gases, such as, fluorine-containing gases with an absorptive or reactive liquid, as for example a caustic solution in the central space of a shell-scrubbing tower.

As used herein the phrase "shell-scrubbing tower" means an unpacked tower wherein the gases to be scrubbed, in this case any corrosive fluorine-containing gas, and the scrubbing material, in the present invention preferably an aqueous solution of sodium hydroxide, enter the tower at or near the top and wherein the inlet gases are released into the tower at or near the top central space so as to bring about the reaction between the corrosive fluorine-containing gases and the aqueous sodium hydroxide near the center of and away from the sides of the tower. In this way the corrosive effects upon the sides of the tower and the apparatus generally are thus reduced to a minimum and a far more efficient disposal of the fluorine-containing gases is effected without unnecessary corrosion of the disposal apparatus.

Figure 2:
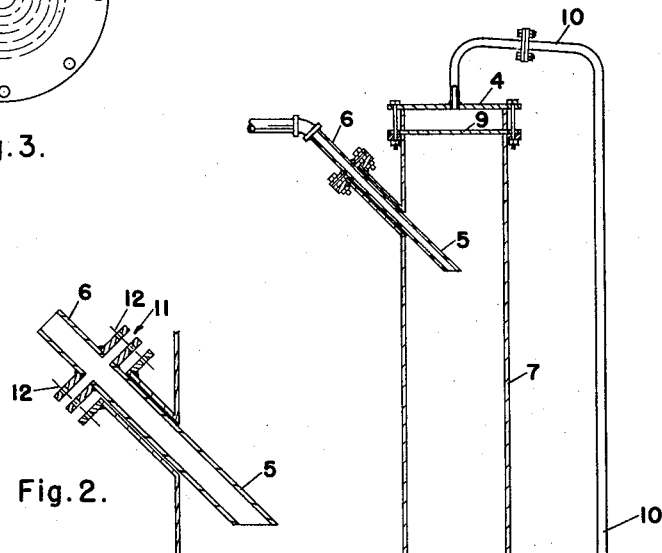
Figure 1:
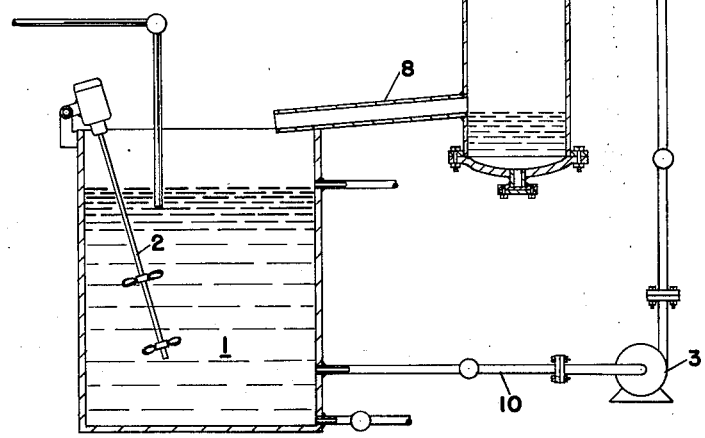

A better understanding of the present invention may be obtained by reference to the accompanying drawing. In the drawing, Fig. 1 shows an elevation of the apparatus employed. The caustic solution is stored in tank 1, which is equipped with a mixer 2, and is pumped to the top of the tower 7 by means of pump 3 through pipes 10 and enters the tower 7 through spray-head 4. Spray-head 4 is provided with a bottom plate 9 which contains a plurality of holes, as is more fully shown in Fig. 3. The liquid passing through said holes descends through the tower 7 and reacts with the fluorine which enters the tower 7 through the centrally disposed end 5 of inlet pipe 6. The structure of this inlet pipe 6 is more fully shown in Fig. 2. In Fig. 2 the supply pipe 6 of the entire assembly is constructed of iron, or Monel metal if water vapor is present in the feed gases and is connected to the inlet pipe 5, which is made of Monel metal, by means of flanges 11. Pipes 5 and 6 are thus secured together in fluid tight relationship. Between the flanges holding together pipes 5 and 6 there is disposed a compression gasket. Exit liquid and gases are removed from tower 7 shown by means of return pipe 8 connecting the bottom of tower 7 to the reservoir 1. Mixer 2 in reservoir 1 provides for mixing of its contents.

Tower 7 of the apparatus shown in the drawings is constructed preferably of Monel metal although high nickel alloys may be used if desired. All piping carrying strong caustic solutions is constructed of saran pipe. It will be noted that the large drain pipe 8 at the bottom of the tower 7 serves both as a liquid exit and inert gas outlet. It was found in practice that a free opening prevented accumulation of sludge in the tower and that no difficulty was experienced as a result of the gas emerging through the same pipe. The downrush of liquid through the tower produces a supply aspirator effect on the inlet pipe which is highly desirable to minimize unpleasant effects due to small leaks.

In one specific mode of operation, an aqueous solution of caustic containing about 8% by weight of NaOH is circulated at a rate of approximately 5 gallons per minute. At this rate, fluorine is absorbed completely in quantities up to 3 pounds per hour of undiluted gas. The exit gases are tested by means of a potassium iodide starch solution as well as a special indicator sensitive to fluorine ion, known as the Harrell Detector. The concentration of corrosive fluorine-containing substances in the exhaust gases under the above conditions is less than 5 parts per million, indicating a good absorption of the by-products, such as oxygen fluoride, as well as the original gas. Any of the inorganic bases such as KOH, etc., may be substituted for the NaOH disclosed in preceding specific example and caustic solutions within the range of .5–20% on a weight basis may be employed although it is preferred to use concentrations of from 5% to 10%.

Reducing agents may be added to the caustic to increase the capacity of the unit for fluorine absorption. For example, in a small scale tower similar to that shown in the drawing, a mixture of 20% fluorine and 80% nitrogen was fed at a rate of 250 cc. per minute. 2.0% caustic was circulated in this tower, with $Na_2S$ added, at the concentration indicated in the table below. This table also shows the effect of the addition of sodium sulfide on the per cent of fluorine removed from the gas stream.

| $Na_2S$ Conc. (M) | Per Cent Fluorine Absorbed |
|---|---|
| ------ | 79 |
| 0.001 | 81 |
| 0.005 | 92 |
| 0.01 | 99 |
| 0.05 | 100 |
| 0.10 | 100 |

While the operation of this disposal unit has been described in terms of the disposal of fluorine, it will be apparent to anyone skilled in the art that this invention may be applied to any corrosive acidic gas. For example HCl, hydrogen fluoride, chlorine, sulfur dioxide, and the like, may be disposed of by means of the method and apparatus of the present invention.

The foregoing disclosure and detailed description have been given for purposes of illustration only and should not be construed as limiting the invention, since obvious modifications will occur to those skilled in the art.

We claim:

The method of disposing of a waste gas containing elemental fluorine which comprises introducing said gas in the top central portion of a vertical chamber under and surrounded by a downward spray of a 0.5 to 20% aqueous caustic soda solution which also contains sodium sulfide in a concentration running from 0.01 molar to 0.1 molar, and absorbing said gas by said solution.

WILLIAM B. BURFORD, III.
HARRY C. ANDERSON.

REFERENCES CITED

The following references are of record in the file of this patent:

UNITED STATES PATENTS

| Number | Name | Date |
|---|---|---|
| 1,869,019 | McIntyre | July 26, 1932 |
| 2,028,336 | Kuhl | Jan. 21, 1936 |
| 2,231,309 | Weber | Feb. 11, 1941 |

OTHER REFERENCES

Landau et al.: "Fluorine Chemistry," reprinted from "Industrial and Engineering Chemistry," pp. 285, col. 2, Mar. 1947.